April 25, 1933.   C. JASS   1,905,384
PULVERIZING ROLLER
Filed Feb. 4, 1932
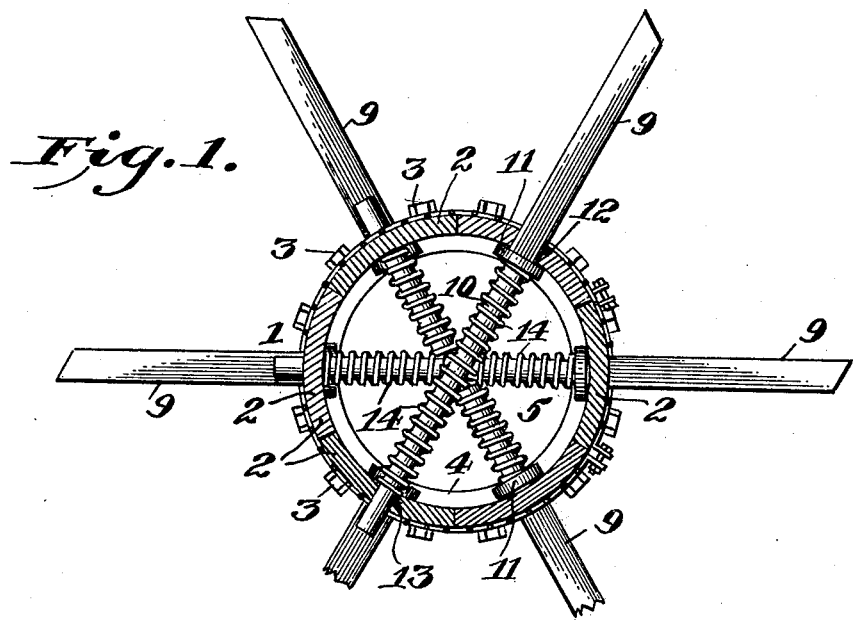
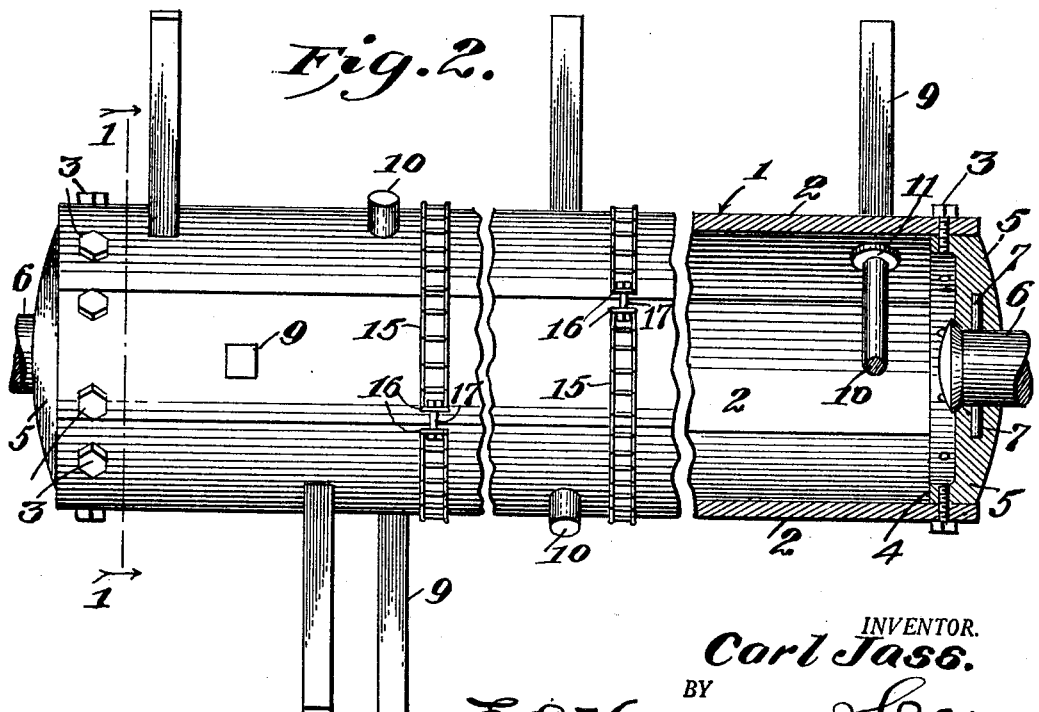
INVENTOR.
Carl Jass.

Patented Apr. 25, 1933

1,905,384

UNITED STATES PATENT OFFICE

CARL JASS, OF HORICON, WISCONSIN

PULVERIZING ROLLER

Application filed February 4, 1932. Serial No. 590,953.

This invention relates to improvements in pulverizing rollers.

An object of my invention is the construction of a roller which will prevent dirt or other foreign objects from entering the drum thereof and interfering with the efficient operation of the device.

Another object of my invention is the construction of a simple and efficient land roller forming an essential part of an improved agricultural machine more specifically described in my co-pending applications.

This invention is an improvement over the disclosure in my United States Patent No. 996,038 issued June 20, 1911.

With the foregoing and other objects in view, my invention comprises certain novel constructions, combinations and arrangements of parts as will be hereinafter fully described, illustrated in the accompanying drawing, and more particularly pointed out in the appended claim.

In the drawing:

Figure 1 is a transverse sectional view of the roller shown in Fig. 2 and taken on the line 1—1 of said figure and looking in the direction of the arrows.

Figure 2 is a view partly in elevation and partly in longitudinal section of a roller constructed in accordance with the present invention.

Referring to the drawing by numerals, 1 designates a drum, which is preferably constructed of a plurality of sections 2, curved in cross section, and which are fastened together by means of bolts 3 extending into the flange 4 of the end or closing disc 5. These end discs are each cast on the end of a shaft 6, which shaft is provided with a pin 7 embedded in the end disc. As shown in Fig. 2, each shaft 6 has a head at its inner end, which head is partly countersunk in the engaged end disc.

A plurality of teeth are arranged in staggered position upon the drum 1, and each tooth is provided with an outer portion 9, square in cross section, and an inner portion 10, circular in cross section, for the purpose hereinafter described. At the contiguous ends of portions 9 and 10, within the drum 1, is formed an integral collar 11 for limiting the outward movement of the tooth upon the drum. The squared portion 9 of each tooth is positioned in a square aperture 12 and the round portion 10 is positioned in a similar aperture 13. The square aperture 12 prevents the tooth from turning upon the drum, although the tooth is free to slide within the aperture. A coiled spring 14 is placed upon the inner cylinder-like portion 10 of each tooth, with one end of said spring bearing against collar 11 and its other end bearing against the inner face of the drum, whereby the tooth is normally held in its operable projecting position, as clearly shown in Fig. 1. Therefore, if any one of the teeth strikes a rock or other hard object, it will be depressed sufficiently to allow the drum to pass over the foreign object, and as soon as the particular tooth passes the interfering object, it will assume its projecting position through the action of its spring.

I place clamping chains 15 on the drum, between its ends, and each chain is provided with outstanding ends 16 held together by means of a bolt 17. By means of these clamping chains, the central portions of the sections 2 are securely retained in an abutting position, which materially increases the efficiency and life of the device.

From the foregoing description, it will be understood that the springs 14 are entirely enclosed, thereby preventing dirt or other foreign objects from interfering with the retracting or extending movement of the teeth, which increases the life of the springs, as well as the efficiency of the roller.

While I have described the preferred embodiment of my invention and illustrated the same in the accompanying drawing, certain minor changes or alterations may appear to one skilled in the art to which this invention relates, during the extensive manufacture of the same, and I, therefore, reserve the right to make such changes or alterations as shall fall within the scope of the appended claim.

What I claim is:

In a device of the class described, the combination of a drum provided with comparatively thick end discs, a separate shaft extending through each end disc, a pin extending from opposite sides of said shaft and entirely embedded in said thick end disc, each shaft provided with a head at its inner end engaging an end disc and partly countersunk in the engaged disc, and spring pressed teeth on said drum, substantially as shown and described.

In testimony whereof I hereunto affix my signature.

CARL JASS.